Oct. 21, 1958 R. J. DODGE 2,856,616
ELECTRICALLY LIGHTED BUOY
Filed June 22, 1956 2 Sheets-Sheet 2
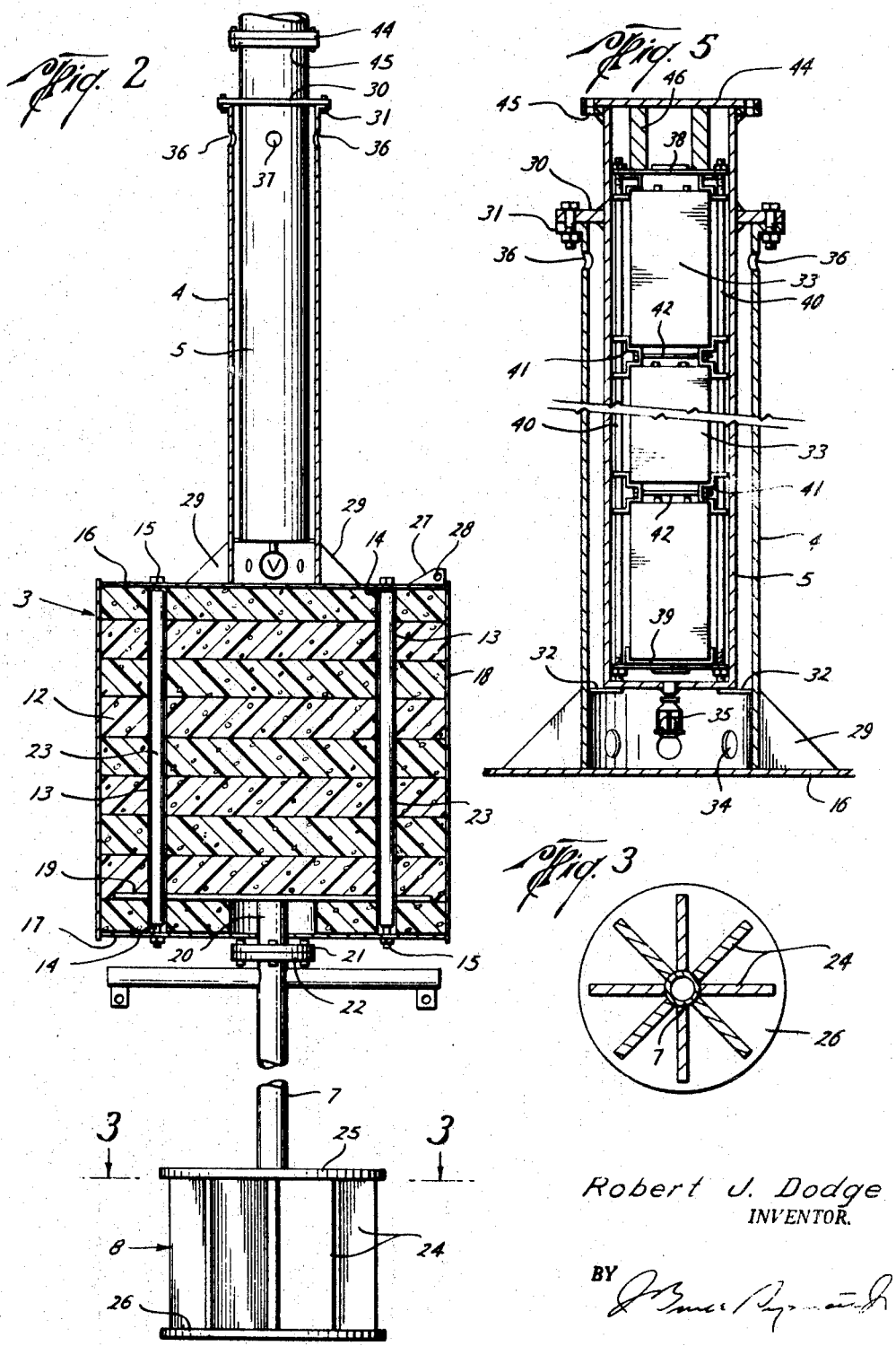
Robert J. Dodge
INVENTOR.
BY
ATTORNEY

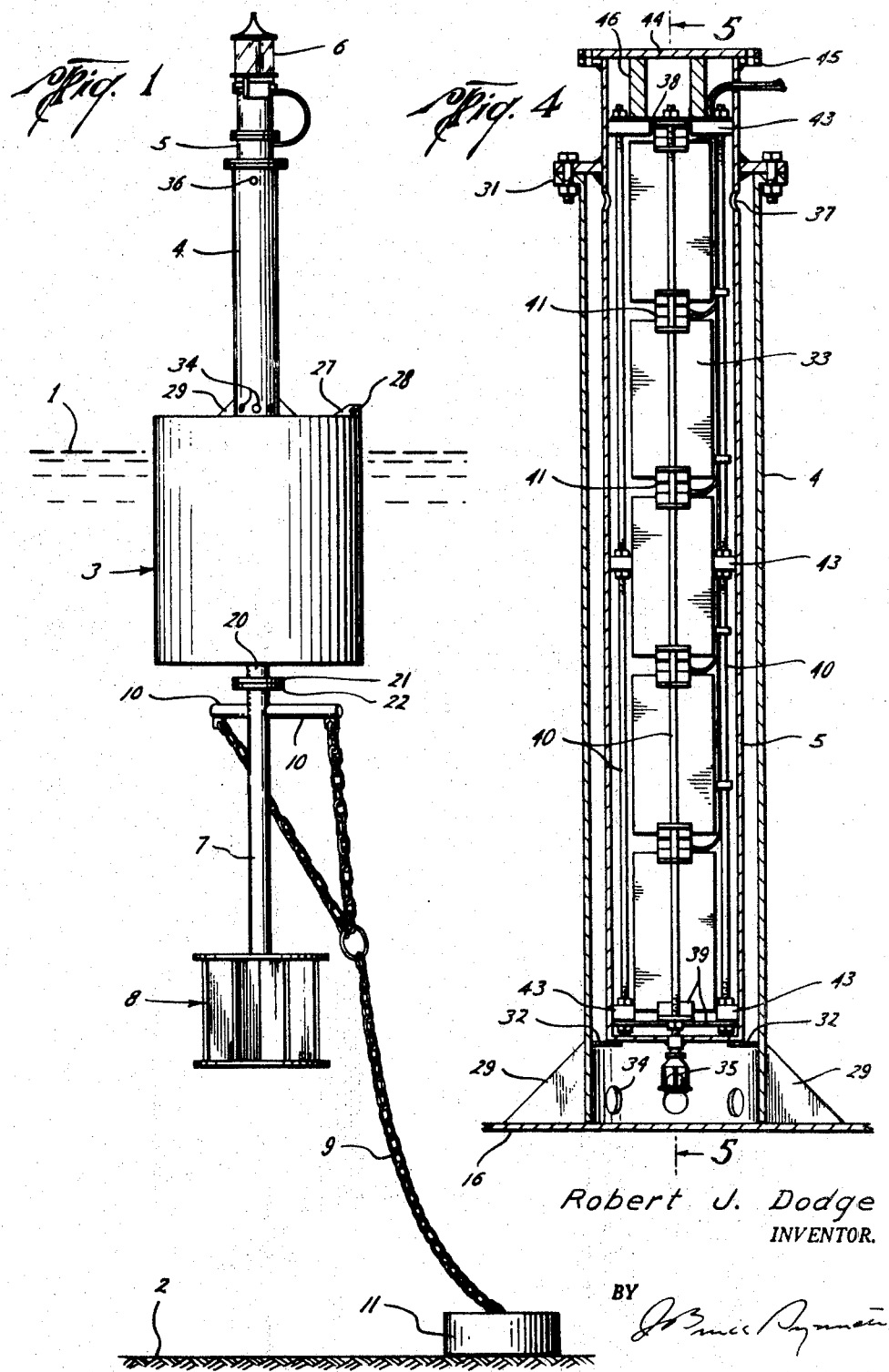
Robert J. Dodge
INVENTOR.
BY
ATTORNEY

2,856,616

ELECTRICALLY LIGHTED BUOY

Robert J. Dodge, Bellaire, Tex., assignor to Buoys, Incorporated, Houston, Tex., a corporation of Texas Application June 22, 1956, Serial No. 593,067

1 Claim. (Cl. 9—8.3)

The invention relates to an electrically lighted buoy, and it concerns more particularly a light carrying buoy of the type commonly used in marine operations to mark the location of channels, submerged objects and the like, as aids to navigation.

It is an object of the invention to provide an electrically lighted buoy in which a plurality of comparatively light weight batteries are used to supply electricity therefor and in which the batteries are positioned above the water line, thereby eliminating the need for an expensive water tight battery compartment.

Another object of the invention is to provide an electrically lighted buoy having a plurality of batteries arranged one above another and clamped together, and in which the entire battery assembly is enclosed within a removable casing whereby the batteries may be replaced as a unit by removing the casing, with the batteries in place, and substituting a complete unit therefor.

A still further object of the invention is to provide a buoy of the type described having a counterweight which is particularly effective in dampening the amplitude of oscillation of the buoy, and which is characterized by a high degree of stability.

The invention will be readily understood by referring to the following description and the accompanying drawing, in which:

Fig. 1 is a side elevational view of a buoy embodying the invention;

Fig. 2 is a fragmentary elevational view on an enlarged scale, partly in section taken on a median line, of the buoy shown in Fig. 1;

Fig. 3 is a sectional plan view taken along the line 3—3 of Fig. 2 and looking in the direction indicated by the arrows;

Fig. 4 is a fragmentary sectional elevational view, on an enlarged scale, showing a portion of the apparatus illustrated in Fig. 2; and Fig. 5 is a fragmentary sectional elevational view taken at right angles to the view shown in Fig. 4.

Referring to Fig. 1 of the drawing, a buoy embodying the invention, as hereinafter described, is shown in one of its operating positions. The numeral 1 indicates the water line of a body of water in connection with which the buoy is adapted to be used, while the numeral 2 designates the bottom of such body of water.

The buoy of the invention includes a float 3, as hereinafter described. An outer battery casing 4 is connected to the float 3 and extends upwardly therefrom. The exterior surface of the outer battery casing 4 preferably is covered with luminous or light reflecting material.

The float 3 is capable of floating freely upon the surface 1 of the body of water. A chain bridle 9 is connected to the outer ends of a pair of arms 10, which are connected to the tubular member 7 immediately below the float 3 and extend outwardly therefrom in opposite directions. The lower end of the bridle 9 is connected to an anchor 11. The anchor 11 may comprise a mass of concrete, for example, and in its operating position rests upon the bottom 2 of the body of water.

As shown in Fig. 2, the float 3 comprises a plurality of circular sections 12, each of which is formed of buoyant material and which are arranged concentrically one above another. The sections 12 advantageously may be formed of cellular plastic materials which are characterized by their hardness and their compressive strength, as well as their light weight and inherent buoyancy, and which are readily available commercially. Expanded synthetic rubber, which is available under the trade name Rubatex, and expanded polystyrene, such as Styrofoam, are examples of such materials.

A plurality of eccentrically positioned, circumferentially spaced openings 13 are formed in each of the sections 12. The corresponding openings 13 of the several sections 12 are aligned with each other and are adapted to receive, respectively, a plurality of rods 14. The rods 14 are passed thru the assembled sections 12, and each of the rods 14 has a pair of nuts 15 threadably connected to its ends.

A circular top plate 16 and a circular bottom plate 17, each of which has openings corresponding to the openings 13 formed therein, are applied to the top side of the uppermost section 12 and the under side of the lowermost section 12, respectively. The assembled sections 12 are clamped between the top plate 16 and the bottom plate 17 by the rods 14 and the nuts 15. A cylindrical jacket 18 surrounds the assembled sections 12 and is rigidly connected at its upper edge to the peripheral edge of the top plate 16.

The tubular member 7 is connected to the float 3 as hereinafter described. A circular plate 19, which has openings corresponding to the openings 13 formed therein, is positioned between the lowermost section 12 and the section immediately above it. A relatively short tubular member 20, which comprises an upward extension of the tubular member 7, is connected to the under side of the plate 19 and extends downwardly thru openings provided therefor in the lowermost section 12 and the bottom plate 17. The lower end of the tubular member 20 is flanged at 21, and is removably connected to the upper end of the tubular member 7, which is flanged at 22.

The plate 19 is insulated electrically from the rods 14 by a plurality of tubes 23, which are formed of electrical insulating material, and each of which surrounds one of the rods 14. The plate 19 and the rods 14 preferably are formed of unlike metals, and the electrical insulation comprising the tubes 23 protects the structure against possible deterioration due to the galvanic action of such metals.

As shown in Figs. 2 and 3 of the drawing, the counterweight 8 comprises a plurality of circumferentially spaced plates 24, which are rectangular in shape and each of which has one edge connected to the tubular member 7 and extends radially outwardly therefrom. A circular top plate 25 and a circular bottom plate 26 are each connected to the tubular member 7 and extend radially outwardly therefrom. The plates 25 and 26 are connected, respectively, to the upper and lower edges of the plates 24.

As shown in Figs. 1 and 2 of the drawing, a pair of lugs 27, one of which is shown, and which are spaced diametrically opposite each other, are attached to the upper side of the top plate 16 and have holes 28 formed therein for use in lifting the buoy.

As shown in Figs. 2, 4 and 5 of the drawing, the outer battery casing 4 comprises a cylinder, open at its ends, which is connected to the upper side of the top plate 16 and extends upwardly therefrom. A plurality of circumferentially spaced gusset plates 29 are connected to the lower end of the casing 4 and the adjacent surface of the top plate 16 whereby the structure is reenforced.

The inner battery casing 5 is arranged concentrically within the outer battery casing 4, and extends upwardly from a point near the lower end of the casing 4 to a point above it. The inner battery casing 5 is flanged at 30, intermediate its ends, and is removably connected to the upper end of the outer battery casing 4, which is flanged at 31. The inner battery casing 5 is spaced radially with respect to the outer battery casing 4, and is centered with respect to the casing 4 by a plurality of spacing members 32, which are attached to the lower end of the inner battery casing 5 and extend radially outwardly therefrom for engagement with the inner wall of the outer battery casing 4.

The inner battery casing 5 is closed at its lower end, and a plurality of batteries 33, which supply electricity for the lantern 6, are received therein. The batteries 33 are of a light weight dry type having air depolarized cells and which require oxygen for depolarization. The batteries 33 are arranged one above another and are clamped together as hereinafter described, whereby they may be handled as a unit upon inserting them in the inner battery casing 5 and withdrawing them therefrom.

A plurality of circumferentially spaced openings 34 are formed in the outer battery casing 4 adjacent its lower end for the admission of air thereto. A float operable check valve 35, which is positioned below the lower end of the inner battery casing 5, is capable of admitting air thereto while excluding water therefrom.

A pair of diametrically opposed openings 35 are formed in the outer battery casing 4 adjacent its upper end for the admission of air thereto. A corresponding pair of diametrically opposed openings 37 are formed in the inner battery casing 5 adjacent its upper end for the admission of air thereto. The openings 37 are spaced circumferentially with respect to the openings 36 whereby water is excluded from the inner battery casing 5.

The batteries 33 are square, and are clamped between a top bracket 38 and a bottom bracket 39, each of which extends beyond the sides of the batteries 33 and has holes formed therein for engagement by two pairs of rods 40.

One pair of rods 40 engages holes provided therefor in a plurality of spacer brackets 41, one pair of which are positioned between each of the batteries 33 and the adjacent battery. The spacer brackets 41 are angular, and are bent substantially 180 degrees intermediate their ends. Aligned holes are formed in the ends of the spacer brackets 41 for engagement with the rods 40. The spacer brackets 41 of each pair are connected intermediate their ends by bolts 42.

Another pair of rods 40 engages holes provided therefor in a plurality of segmental spacer members 43, which are positioned on opposite sides of the batteries 33 whereby the battery assembly is spaced radially with respect to the inner battery casing 5.

A blind flange 44 is connected to the upper end of the inner battery casing 5, which is flanged at 45. A pair of spacer blocks 46 are positioned between the top bracket 38 and the blind flange 44.

The lantern 6 is positioned above the flange 44, and is connected electricially to the batteries 33.

An important feature of the invention is the arrangement of the batteries 33. The comparatively light weight of the batteries 33 permits them to be positioned above the water line 1, and eliminates the need for a water tight compartment for the batteries. The buoy as a whole is of light weight construction, and is relatively inexpensive. The batteries 33 are arranged one above another, and are clamped together in the manner described, and the entire battery assembly is enclosed within the inner battery casing 5. The batteries 33 may be replaced as a unit by removing the inner battery casing 5, with the batteries 33 in place, and substituting a complete unit therefor.

Another important feature of the invention is the structure of the counterweight 8. The circumferentially spaced plates 24 of the counterweight 8 dampen the amplitude of oscillation of the buoy, in response to the action of wind and waves, and are particularly effective when the cyclic disturbance of the sea coincides with the natural frequency of the buoy, causing it to be set in violent oscillation. This is particularly important in small buoys. The buoy of the invention is relatively stable, and in this respect it compares favorably with larger, more expensive buoys.

The invention may be modified in various ways without departing from the spirit and scope thereof.

I claim:

In an electrically lighted buoy, the combination of a float, an outer battery casing connected to the float and extending upwardly therefrom, an inner battery casing disposed partly within the outer battery casing and extending upwardly therefrom, the inner battery casing being removably connected to the outer battery casing, a plurality of air depolarized dry cell batteries disposed within the inner battery casing, the batteries being arranged one above another and being clamped together whereby they may be handled as a unit in inserting them in the casing and removing them therefrom, the inner and outer battery casings having openings therein capable of admitting air to the batteries while excluding water therefrom, said openings comprising a plurality of circumferentially spaced openings in the outer battery casing adjacent its lower end, a float operable check valve below the lower end of the inner battery casing and in fluid communication therewith, a pair of diametrically opposed openings in the outer battery casing adjacent its upper end, and a corresponding pair of diametrically opposed openings in the inner battery casing adjacent its upper end, the openings in the inner and outer battery casings adjacent their upper ends being spaced circumferentially relative to each other, a lantern removably connected to the inner battery casing and extending upwardly therefrom, a counterweight positioned below the float, and means connecting the counterweight to the float in spaced relation thereto.

References Cited in the file of this patent

UNITED STATES PATENTS

| | | |
|---|---|---|
| 935,717 | Williams | Oct. 5, 1909 |
| 1,248,850 | Hartman | Dec. 4, 1917 |
| 1,372,591 | Bichek | Mar. 22, 1921 |
| 1,974,832 | Peterson | Sept. 25, 1934 |
| 2,119,854 | Day | June 7, 1938 |
| 2,352,862 | Rabuse | July 4, 1944 |
| 2,364,144 | Hunsaker | Dec. 5, 1944 |
| 2,539,403 | Crim et al. | Jan. 30, 1951 |